April 28, 1959

C. ZELNICK 2,883,758

APPARATUS FOR MEASURING THE SIZE AND SYMMETRY
OF AN OPENING FORMED IN A WORK PIECE

Filed Dec. 7, 1956

INVENTOR.
CHARLES ZELNICK

BY *Learman & Learman*

ATTORNEYS

United States Patent Office 2,883,758
Patented Apr. 28, 1959

2,883,758

APPARATUS FOR MEASURING THE SIZE AND SYMMETRY OF AN OPENING FORMED IN A WORK PIECE

Charles Zelnick, Saginaw, Mich., assignor to Lufkin Rule Company, Saginaw, Mich., a corporation of Michigan Application December 7, 1956, Serial No. 626,850

13 Claims. (Cl. 33—178)

This invention relates to apparatus useful in measuring the size and symmetry of an opening formed in a work piece, and more particularly the invention has reference to apparatus for enabling the trueness of a round opening, such as a cylinder bore, formed in an engine block to be measured with high accuracy.

In forming cylinder bores in work pieces such as engine blocks, the tool does not always bore a perfectly round opening, that is, an opening which is symmetrical about the longitudinal axis of the opening. In other words, an opening bored in a work piece may be somewhat oval or elliptical in cross-section or, more simply, out of round. The prior art contains many examples of instruments for determining the accuracy of a boring operation, one of which is represented in copending application Serial No. 417,983, filed March 23, 1954, now Patent No. 2,826,820, issued March 18, 1958. Apparatus constructed in accordance with the instant invention includes all of the advantages possessed by the device disclosed in the above identified copending application, but constitutes an improvement thereover.

In the aforementioned copending application there is disclosed a gauge having three contact arms, each of which is arranged in a common plane and angularly spaced 120° from its adjacent legs. The movements of the contact parts are controlled by a single actuating mechanism which may be operated to effect movement of the three contact members until such time as all three of them engage the inner surface of the bore to be measured. With such a device it is possible to measure the diameter of the bore, but it is not always possible to detect slight deviations from true roundness of the bore.

Apparatus constructed in accordance with the present invention comprises at least two pairs of movable members arranged in substantially the same plane and spaced from one another by 90° so as to provide at least two pairs of opposed contacts. Each of the bore wall engaging parts of the pairs of members is movable in response to actuation of adjusting mechanism and each of the pairs of contact members is adjustable independently of the other pairs. In this arrangement of parts, one set of contact members may be moved into engagement with the inner surface of the bore to be measured by actuation of its adjusting mechanism, and then another set of angularly spaced members may be moved into engagement with the side walls of the bore by actuation of its associated adjusting mechanism. Then, by observation of indicia associated with each adjusting mechanism, the extent of movement of each pair of contacts may be measured and compared to ascertain the size and trueness of the bore. Alternatively, the device may be rotated through substantially 90° after the contacts are moved into engagement with the walls of the bore. If the device cannot be rotated through at least 90°, it will be apparent that the bore is not perfectly round. In this instance, only one of the adjusting parts need be calibrated in order that the size and symmetry of the bore may be readily and accurately determined.

An object of the invention is to provide improved apparatus for determining the size and symmetry of an opening formed in a work piece.

Another object of the invention is to provide apparatus of the kind referred to which is so constructed as to enable the longitudinal axis of the apparatus to be located and maintained in parallelism with the longitudinal axis of the hole or bore to be measured.

A further object of the invention is to provide a bore gauge capable of precision measurements, but being sturdy and durable in use.

A still further object of the invention is to provide a precision instrument of the kind referred to which easily can be assembled and disassembled for repair, lubrication, or other purposes.

Other objects and advantages of the invention will be pointed out specifically or will become apparent from the following description when it is considered in conjunction with the appended claims and the accompanying drawings, in which:

Figure 3:
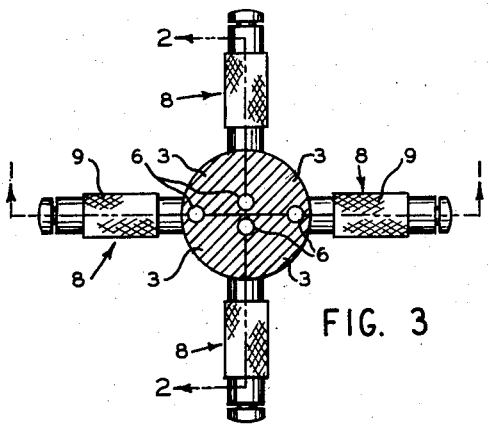
Figure 3 is a view partly in top plan and partly in section, the section being taken on the line 3—3 of Figure 1.
Figure 4:
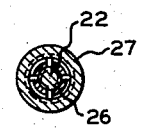
Figure 4 is a sectional view taken on the line 4—4 of Figure 2.
Figure 1:
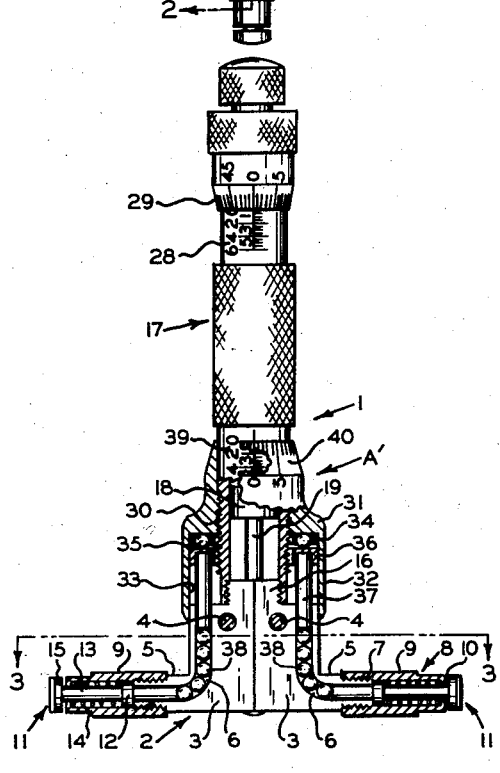
Figure 1 is a view partly in elevation and partly in section of a bore gauge embodying the invention, the section being taken substantially on the line 1—1 of Figure 3.
Figure 2:
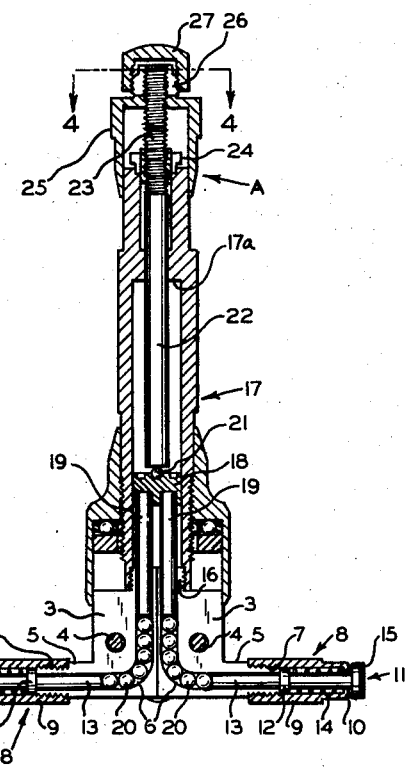
Figure 2 is a sectional view generally similar to Figure 1, the section being taken on the line 2—2 of Figure 3 and showing the gauge rotated through 90°.

In the embodiment of the invention disclosed in the drawing, a bore gauge generally indicated by the reference character 1 comprises a head member 2 composed of four quarter sections 3 removably maintained in assembled relation by means of screws or the like, two of which are shown at 4 in each of Figures 1 and 2. At corresponding ends of each of the quarter sections 3 is a right angular extension 5 which is grooved on its inner surface to form one-half of the lower portion of a right angular channel 6. Each quarter section 3 is similarly provided with an internal groove to form one-half of the remaining portion of the right angular channel 6. When the four sections of the head member 2 are in assembled condition, there will be four separate channels 6 which extend downwardly through the head member 2 and then radially of the latter and through each of the extensions 5. As is best shown in Figure 3, the channels 6 are arranged in opposed pairs, the channels of one pair being located closer to the longitudinal axis of the head member than the channels of the other pair, the purpose of which will be explained hereinafter.

The outer ends of each of the extensions 5 lie in substantially the same plane and are screw threaded, as is shown at 7 in Figures 1 and 2, for reception of a screw threaded, hollow cap member 8. To facilitate the installation of the cap members 8 on their respective extensions 5, the former may be provided with a knurled finger section 9. The radially outermost end of each of the cap members 8 is provided with an aperture of smaller diameter than the diameter of the cap member so that a small flange 10 surrounds the aperture.

Mounted for reciprocal movement within each of the cap members 8 is a work engageable member 11 having an enlargement 12 intermediate the ends of its shank 13. In the initial position of the members 11, the rear end of each shank 13 is received within its respective channel 6 with the enlargement 12 bearing against the outer end of the extension 5. Each work engageable member 11 normally is maintained in its initial position, i.e., in its retracted or radially inward position, by means of a light coil spring 14 which reacts between the enlargement 12 and the flange 10 at the outer end of the cap 8. The other end of each member 11 extends through the flange 10 and is equipped at its outer end with a work piece contacting part 15 which, as is shown in Figures 1 and 2, is rectilinear or straight in a plane parallel to the longitudinal axis of the head member, but which is curved, as is shown in Figure 3, in a direction at right angles thereto. The significance of the particular construction of the work piece contacting part 15 will be pointed out subsequently.

Referring to Figures 1 and 2, the upper end of the head member 2 terminates in a threaded boss 16 which receives the interiorly threaded, lower end of a bored micrometer barrel 17. Slidably mounted within the bore of the barrel 17 is a reciprocable plug 18, in the under side of which is press fitted a pair of diametrally opposed rods or plungers 19. The lower ends of the plungers 19 are slidably received in the upper ends of the chambers 6 which lie closer to the longitudinal axis of the head member 2, and the space between the lower ends of the plungers 19 and the innermost ends of the numbers 11 is occupied by a plurality of motion transmitting spherical balls or rollers 20. In the upper portion of the plug 18 is mounted a spherical thrust bearing 21 against which the lower end of a micrometer spindle 22 bears. The upper portion of the spindle 22 is threaded as at 23, and is in threaded engagement with a threaded nut 24 which is fixed at the upper end of the barrel 17. The inner surface of the barrel 17 includes an apertured shoulder 17a which assists in supporting and guiding the spindle 22.

Telescoped over the upper end of the barrel 17 so as to enclose the nut 24 is an actuating or adjusting device A which includes a sleeve member 25, the upper end of which is provided with a split head section 26 which is internally threaded to receive the threaded upper end 23 of the micrometer spindle 22. Threaded onto the head section 26 is a cap 27 which clamps the split sections of the head member 26 tightly against the spindle 22 so that rotation of either the cap 27 or the sleeve 25 will cause corresponding rotation of the micrometer spindle 22 to cause the latter to move axially of the bore of the barrel 17. Adjustment of the spindle 22 to cause it to move inwardly of the barrel 17 will result in downward movement of the plug 18 as viewed in Figures 1 and 2, and, consequently, downward movement of the plungers 19. Downward movement of the latter will be transmitted via the spherical balls 20 to the work engaging members 11 whereupon the latter will be projected radially outwardly until the work contacting parts 15 engage the side walls of the bore or opening to be measured. To determine the extent of movement of the work piece engageable members 11, the barrel 17 may be provided with a scale or suitable indicia 28 adapted to be read in conjunction with a circumferential scale 29 carried by the sleeve 25 of the adjusting mechanism A.

The lower end of the barrel 17 is threaded externally as is shown at 30 in Figure 1. Threadedly received on the lower portion of the barrel 17 and concentric with the adjusting device A is another adjusting device A', including a collar 31 having an enlarged portion 32 at its lower end which is counterbored as at 33 to provide an inner chamber. Within the chamber 33 is mounted a washer or the like 34 in which is mounted a plurality of spherical thrust bearings 35 which bear against the base of the chamber 33 and against a second washer-like part 36 mounted within the chamber 33. Press fitted into the lower surface of the washer part 36 is a pair of diametrally opposed plungers 37, similar to the plungers 19, but located farther away from the longitudinal axis of the head member 2. The lower ends of the plungers 37 are slidably received in the upper ends of the correspondingly located channels 6 which communicate with the second opposed pair of work piece engageable members 11. Interposed between the lower ends of the plungers 37 and the radially innermost ends of the associated work piece engageable members 11 is a plurality of spherical rollers 38, similar to the rollers 20, and which function in a similar manner to transmit vertical movement of the plungers 37 to the work piece engageable members 11. The amount of movement of the members 11 under the influence of the adjusting means 31 may be measured by reading measuring indicia provided both on the barrel 17 and on the collar 31 as indicated at 39 and 40, respectively.

Because of the location of the separate pairs of channels and plungers at different distances from the longitudinal axis of the head member, each of the work engageable members is movable radially from a common center the exact distance the plungers move vertically, and without the necessity of providing complex linkages.

In the operation of the apparatus, the adjusting devices A, A' may be moved relatively to the micrometer barrel 17 in a direction opposite to the direction in which they are moved to extend the work piece engageable members 11. Adjustment of the parts A, A' in this direction will carry with them the respective plungers 19 and 37 so as to enable the springs 14 to move the work engageable members 11 radially inwardly a distance sufficient to enable the head member 2 to be positioned within the opening to be measured. When the head member 2 is inserted into the opening to be measured, one or the other of the adjusting means A, A', may be actuated so as to extend the associated pair of work engaging members 11 radially outwardly of the head member 2 until such time as the work engaging parts 15 contact the side walls of the opening to be measured. When the individual parts 15 of the one pair of members 11 are in engagement with the walls of the opening to be measured, the other adjusting means A or A' may be actuated so as to advance the other pair of members 11 into engagement with the side walls. Then the readings of the two sets of scales may be taken and if they coincide, the operator will know that the opening is symmetrical about its center. If the two readings do not coincide, however, the operator will know that the opening is not symmetrical and by comparing the readings of the two sets of scales he may determine the degree of which the opening is out of round.

An alternative practice would be to extend both pairs of work engageable members 11 in the manner previously described and then rotate the instrument 90°. If the instrument can be rotated 90°, the operator will know that the opening is symmetrical about its longitudinal axis, but if it cannot be so rotated, then the operator will know that the opening is not truly round. When using the apparatus in this manner, it would not be necessary to provide indicia for both of the adjusting devices. It would be sufficient to provide indicia for only one device and use the associated pair of work piece engageable members to determine the degree of irregularity of the opening.

As has been pointed out previously, the work contacting part 15 or each work piece engageable member 11 is planar in one direction and curved in a direction at right angles thereto. The part 15 should be made planar in the direction which would be parallel to the surface of the opening to be measured so that when the apparatus is in use, and all pairs of work piece engageable members are in contact with the side walls of the opening, the axis of the head member 2 will either coincide with or be substantially parallel to the longitudinal axis of the opening being measured. By constructing the parts 15 in this manner, the planar portions of the parts 15 will prevent canting of the guage within the opening when the device is being used for measuring purposes. The radius of curvature of the curved portion of part 15 should be so selected that it is less than the radius of the opening being measured. If this is done, then only the extreme radial portion of each of the parts 15 will engage the work piece sides.

The disclosed embodiment is representative to a preferred form of the invention, but is intended to be illustrative rather than definitive of the invention. The invention is defined in the claims.

I claim:

1. Apparatus for measuring the symmetry of an opening formed in a work piece, said apparatus comprising a head member; a plurality of pairs of work piece engageable members mounted in said head member for movement from an initial position such as to permit insertion of said head member into the opening, to a second position in engagement with the sides of said opening; first adjusting means rotatably carried by said head member; second adjusting means rotatably carried by said head member, said first and second adjusting means being concentric; and means interconnecting each of said first and second adjusting means and different pairs of said plurality of pairs of work piece engageable members for effecting movement of the latter relative to said head member from said initial position to said second position in response to rotation of the associated adjusting means.

2. Apparatus as set forth in claim 1 in which each member of said plurality of pairs of work piece engageable members includes a part which is curved in one direction and planar in a direction at right angles to said first mentioned direction.

3. Apparatus as set forth in claim 2 in which said part is planar in a direction substantially parallel to the side of the opening it is to engage.

4. Apparatus as set forth in claim 1 including indicia on each of said first and second adjusting means for determining the extent of movement of the associated work piece engageable members from said first position to said second position.

5. Apparatus as set forth in claim 1 in which said interconnecting means includes plungers connected to their associated adjusting means and communicating with their associated work piece engageable members through channels in said head member, and means in said channels in engagement with said plungers and with said work piece engageable members for transmitting movement of said plungers to said members.

6. Apparatus as set forth in claim 5 in which said last mentioned means comprises a plurality of spherical rollers.

7. Apparatus as set forth in claim 1 including means reacting between said head member and each of said work piece engageable members for biasing the latter to its said initial position.

8. Apparatus for measuring the symmetry of an opening formed in a work piece, said apparatus comprising a head member; a plurality of pairs of work piece engageable members mounted in said head member for movement relative to said head member from an initial position such as to permit insertion of said head member into the opening, to a second position in engagement with the sides of the opening, said work piece engageable members being angularly spaced from one another and radiating from a common center, first adjusting means carried by said head member; second adjusting means carried by said head member; means interconnecting said first adjusting means and certain of said pairs of work piece engageable members; and means interconnecting said second adjusting means and the remaining pairs of work piece engageable members, each of said first and second adjusting means being operable for effecting said relative movement of its associated work piece engageable members independently of the others.

9. Apparatus as set forth in claim 8 including indicia associated with each of said adjusting means for measuring the extent of movement of each of said work piece engageable members.

10. Apparatus as set forth in claim 8 in which each of said interconnecting means includes plungers connected to the respective adjusting means and communicating with the respective pairs of work piece engageable members through channels formed in said head member, and means in said channels in engagement with the associated plungers and work piece engageable members for transmitting movement of the former to the latter.

11. Apparatus as set forth in claim 10 in which said last mentioned means comprises a plurality of spherical rollers.

12. Apparatus as set forth in claim 8 in which each of said work piece engageable members includes a part curved in one direction and planar in a direction normal to said one direction.

13. Apparatus as set forth in claim 12 in which said part is planar in a direction extending axially of the opening to be measured.

References Cited in the file of this patent

UNITED STATES PATENTS

| 1,300,841 | Johansson | Apr. 15, 1919 |
| 2,788,582 | Middeler | Apr. 16, 1957 |

FOREIGN PATENTS

| 344,062 | Germany | Nov. 14, 1921 |
| 612,457 | Great Britain | Nov. 12, 1948 |
| 965,491 | France | Feb. 15, 1950 |